(12) United States Patent
Li et al.

(10) Patent No.: US 11,232,709 B2
(45) Date of Patent: Jan. 25, 2022

(54) SYSTEM OF AUTOMATIC DRIVING ASSISTANCE, ROADSIDE ASSISTANCE AND VEHICLE-SIDE ASSISTANCE

(71) Applicant: Beijing Tusen Zhitu Technology Co., Ltd., Beijing (CN)

(72) Inventors: Wenrui Li, Beijing (CN); Yiming Li, Beijing (CN); Nan Wu, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 212 days.

(21) Appl. No.: 16/243,878

(22) Filed: Jan. 9, 2019

(65) Prior Publication Data

US 2019/0236950 A1    Aug. 1, 2019

(30) Foreign Application Priority Data

Jan. 11, 2018    (CN) .......................... 201810025516.X

(51) Int. Cl.
| | |
|---|---|
| *G08G 1/00* | (2006.01) |
| *G08G 1/0967* | (2006.01) |

(Continued)

(52) U.S. Cl.
CPC ..... *G08G 1/096725* (2013.01); *G05D 1/0088* (2013.01); *G05D 1/0285* (2013.01);
(Continued)

(58) Field of Classification Search
CPC .......... G08G 1/096725; G08G 1/0116; G08G 1/0145; G08G 1/096741; G08G 1/09675;
(Continued)

(56) References Cited

U.S. PATENT DOCUMENTS

| | | | | |
|---|---|---|---|---|
| 9,786,182 | B2 * | 10/2017 | Calmettes | ............ G05D 1/0293 |
| 2007/0198144 | A1 * | 8/2007 | Norris | ..................... H04L 67/12 |
| | | | | 701/23 |

(Continued)

FOREIGN PATENT DOCUMENTS

| | | |
|---|---|---|
| CN | 101051418 A | 10/2007 |
| CN | 204791558 A | 11/2015 |

(Continued)

OTHER PUBLICATIONS

"Mori Akifumi, Roadside environment monitoring system (English), ip.com" (Year: 2002).*

(Continued)

*Primary Examiner* — James M McPherson
(74) *Attorney, Agent, or Firm* — Paul Liu; Julie J. Muyco; Perkins Coie, LLP

(57) ABSTRACT

The present document describes an autonomous driving assistance system, a roadside assistance system and a vehicle-mounted assistance system. The autonomous driving assistance system may include at least one roadside sensor, a roadside device, a roadside Vehicle to Everything (V2X) communication device and a vehicle-mounted V2X communication device. The at least one roadside sensor may be configured to collect environment information of a surrounding environment and transmit the environment information to the roadside device. The roadside device may be configured to process the received environment information to obtain perception information and transmit the perception information to the roadside V2X communication device. The roadside V2X communication device may be configured to transmit the received perception information to the vehicle-mounted V2X communication device. The vehicle-mounted V2X communication device may be configured to transmit the received perception information to a vehicle-mounted autonomous driving system.

23 Claims, 5 Drawing Sheets

(51) Int. Cl.
  *G08G 1/01*      (2006.01)
  *G05D 1/00*      (2006.01)
  *H04W 4/40*      (2018.01)
  *G05D 1/02*      (2020.01)

(52) U.S. Cl.
  CPC ......... *G05D 1/0291* (2013.01); *G08G 1/0116* (2013.01); *G08G 1/0145* (2013.01); *G08G 1/09675* (2013.01); *G08G 1/096741* (2013.01); *G08G 1/096783* (2013.01); *H04W 4/40* (2018.02); *G05D 2201/0213* (2013.01)

(58) Field of Classification Search
  CPC . G08G 1/096783; H04W 4/40; G05D 1/0088; G05D 1/0285; G05D 1/0291
  USPC ........................................................ 701/117
  See application file for complete search history.

(56) References Cited

U.S. PATENT DOCUMENTS

| | | | | |
|---|---|---|---|---|
| 2013/0258878 | A1* | 10/2013 | Wakikawa | G08G 1/096758 370/252 |
| 2015/0051780 | A1* | 2/2015 | Hahne | B60W 10/20 701/23 |
| 2017/0228258 | A1* | 8/2017 | Shifman | G06F 9/5027 |
| 2018/0183873 | A1* | 6/2018 | Wang | H04L 67/02 |
| 2019/0268447 | A1* | 8/2019 | Yang | H04W 4/40 |

FOREIGN PATENT DOCUMENTS

| | | |
|---|---|---|
| CN | 105761521 A | 7/2016 |
| CN | 106340197 A | 1/2017 |
| CN | 106467112 A | 3/2017 |
| CN | 106781591 A | 5/2017 |
| CN | 107031600 A | 8/2017 |
| CN | 107807633 A | 3/2018 |
| CN | 108010360 A | 5/2018 |
| JP | 2002230685 A * | 8/2002 |

OTHER PUBLICATIONS

"Ricardo Martins, IMC: A Communication Protocol for Networked Vehicles and Sensors, May 11-14, 2009, OCEANS 2009—Europe, p. 1-6" (Year: 2009).*

No Author. Chinese Application No. 201810025516.X, First Search Report, dated Aug. 25, 2019, pp. 1-2.

* cited by examiner

SYSTEM OF AUTOMATIC DRIVING ASSISTANCE, ROADSIDE ASSISTANCE AND VEHICLE-SIDE ASSISTANCE

TECHNICAL FIELD

The present disclosure relates to automatic driving technology, and more particularly, to an automatic driving assistance system, a roadside assistance system and a vehicle-mounted assistance system.

BACKGROUND

An automatic driving system is a highly complicated system that includes functional modules for sensing, traffic information detection, obstacle detection, decision making, vehicle control and the like. Among them, the sensing part is especially important as it serves as a basis of the other functional modules.

At present, information on an environment around a vehicle is mainly sensed by a sensor mounted on the vehicle. For example, a vehicle-mounted sensor (e.g., vehicle-mounted camera, laser radar, millimeter wave radar, positioning sensor, etc.) can be provided to obtain the information on the environment around the vehicle. However, in some special scenarios, the field of view of the vehicle-mounted sensor may be blocked, such that the information on the environment around the vehicle cannot be obtained accurately and comprehensively, which in turn may lead to unsafety in automatic driving of the vehicle. For example, in a coastal port area, a highway port area, a cargo distribution center, a warehouse, a mining area or the like, a large number of containers, stacks of goods, parcels and the like may be piled up, such that the field of view of the vehicle-mounted sensor may be blocked. Therefore, how to obtain the information on the environment around the vehicle comprehensively and accurately in such special scenarios so as to ensure safety and reliability of automatic driving of the vehicle has become a technical problem to be solved by those skilled in the art.

SUMMARY

In view of the above problem, the present disclosure provides an automatic driving assistance system, a roadside assistance system and a vehicle-mounted assistance system, capable of solving the technical problem in the related art that information on an environment around a vehicle cannot be obtained accurately and comprehensively when the environment is complex and has many obstacles.

In a first aspect, according to an embodiment of the present disclosure, an automatic driving assistance system is provided. The system includes: a roadside assistance system and a vehicle-mounted assistance system. The roadside assistance system includes a roadside sensor, a roadside device and a roadside Vehicle to Everything (V2X) communication device. The vehicle-mounted assistance system includes a vehicle-mounted V2X communication device. The roadside sensor is configured to collect environment information of an ambient environment and transmit the environment information to the roadside device. The roadside device is configured to process the received environment information to obtain sensed information and transmit the sensed information to the roadside V2X communication device. The roadside V2X communication device is configured to transmit the received sensed information to the vehicle-mounted V2X communication device. The vehicle-mounted V2X communication device is configured to transmit the received sensed information to a vehicle-mounted automatic driving system.

In a second aspect, according to an embodiment of the present disclosure, a roadside assistance system is provided. The system includes a roadside sensor, a roadside device, and a roadside V2X communication device. The roadside sensor is configured to collect environment information of an ambient environment and transmit the environment information to the roadside device. The roadside device is configured to process the received environment information to obtain sensed information and transmit the sensed information to the roadside V2X communication device. The roadside V2X communication device is configured to transmit the received sensed information to a vehicle-mounted V2X communication device.

In a third aspect, according to an embodiment of the present disclosure, a vehicle-mounted assistance system is provided. The system includes a vehicle-mounted V2X communication device connected to a vehicle-mounted automatic driving system. The vehicle-mounted V2X communication device is configured to receive sensed information from a roadside V2X communication device and transmit the received sensed information to the vehicle-mounted automatic driving system.

With the solutions according to the embodiments of the present disclosure, a roadside assistance system is provided at both sides of a road. The roadside assistance system collects environment information of an ambient environment and shares the environment information with a vehicle-mounted automatic driving system by means of V2X communication technique. With the solutions according to the present disclosure, supplementary information on an environment around a vehicle can be collected by a roadside assistance system near the vehicle and shared with a vehicle-mounted automatic driving system. In this way, the technical problem in the related art that information on an environment around a vehicle cannot be obtained by vehicle-mounted sensors accurately and comprehensively when the environment is complex and has many obstacles. Further, the V2X communication technique is a technique capable of achieving wireless communications between vehicles or between vehicles and roadside devices. It has characteristics of non-Line of Sight (LOS) communications and is capable of maintaining reliable communications with high stability and low latency, regardless of obstacles in the field of view. Hence, with the V2X communication technique, the information on the environment around the vehicle as collected by the roadside assistance system can be shared with the vehicle-mounted automatic driving system with higher stability and reliability and higher success rate.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

The solutions according to the embodiments of the present disclosure can be applied to various scenarios with complex environments and many obstacles, such as a coastal port area, a highway port area, a cargo distribution center, a warehouse, a mining area, a campus or the like. The present disclosure is not limited to any specific application scenario of the solutions. In the embodiments of the present disclosure, a self-driving vehicle may be a truck, a bus, a public transportation bus, a truck, a passenger car, a sprinkler, a sweeping vehicle, an electric vehicle, or the like.

Embodiment 1

Figure 1:
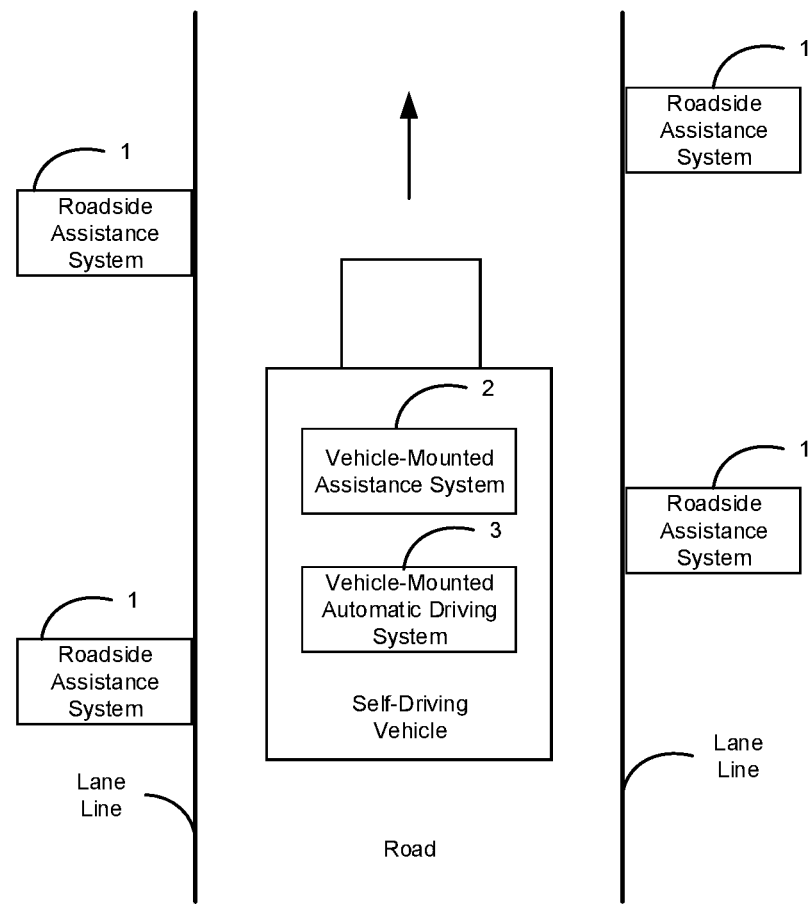
FIG. 1 is a first schematic diagram showing a structure of an automatic driving assistance system according to an embodiment of the present disclosure.

Referring to FIG. 1, which is a schematic diagram showing a structure of an automatic driving assistance system according to an embodiment of the present disclosure, the automatic driving assistance system includes a roadside assistance system 1 and a vehicle-mounted assistance system 2. The vehicle-mounted assistance system 2 is connected communicatively to a vehicle-mounted automatic driving system 3. The roadside assistance system 1 is provided on both sides of a road. The vehicle-mounted assistance system 2 and the vehicle-mounted automatic driving system 3 are provided on a self-driving vehicle.

Figure 2:
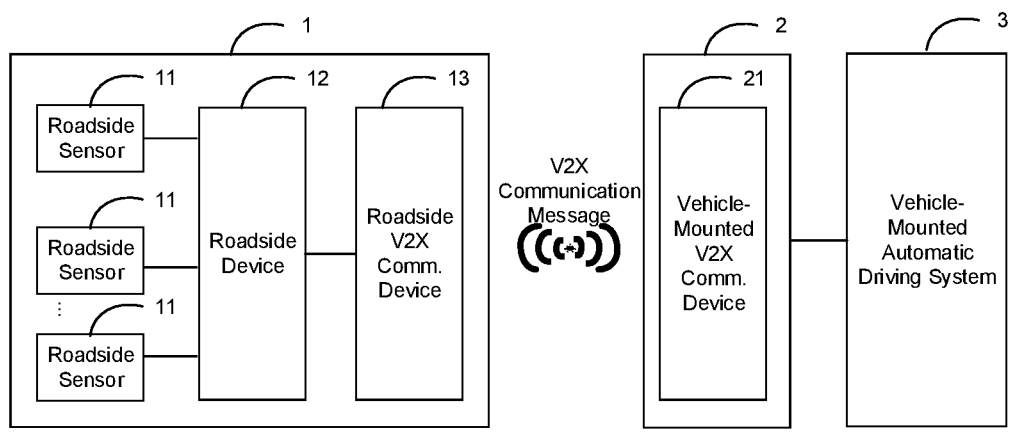
FIG. 2 is a second schematic diagram showing a structure of an automatic driving assistance system according to an embodiment of the present disclosure.

As shown in FIG. 2, the roadside assistance system 1 includes roadside sensors 11, a roadside device 12 and a roadside V2X communication device 13. The vehicle-mounted assistance system 2 includes a vehicle-mounted V2X communication device 21.

The roadside sensors 11 are configured to collect environment information of an ambient environment and transmit the environment information to the roadside device 12.

The roadside device 12 is configured to process the received environment information to obtain sensed information and transmit the sensed information to the roadside V2X communication device 13.

The roadside V2X communication device 13 is configured to transmit the received sensed information to the vehicle-mounted V2X communication device 21.

The vehicle-mounted V2X communication device 21 is configured to transmit the received sensed information to the vehicle-mounted automatic driving system 3.

In an embodiment of the present disclosure, the roadside sensors 11 include any one or more types of sensors such as cameras, laser radars, millimeter wave radars, positioning sensors, illumination sensors, wind speed sensors, wind direction sensors, air quality sensors, temperature sensors or humidity sensors. Environment information collected by a camera may include image data. Environment information collected by a laser radar may include laser point cloud data. Environment information collected by a millimeter wave radar may include laser point cloud data. Environment information collected by a positioning sensor may include position information. Environment information collected by an illumination sensor may include a voltage value representing an illumination intensity. Environment information collected by a wind speed sensor may include a wind speed voltage value representing a wind speed. Environment information collected by a wind direction sensor may include a wind direction voltage value representing a wind direction. Environment information collected by an air quality sensor may include serial interface data containing PM 2.5 concentration information or PM 10 concentration information. Environment information collected by a temperature sensor may include temperature information. Environment information collected by a humidity sensor may include humidity information.

The environment information collected by a camera or a laser radar contains a large amount of data. If the environment information collected by a camera or a laser radar is transmitted directly to the vehicle side, there will be a high requirement on a V2X communication bandwidth. However, the communication distance and communication quality of the V2X communication is inversely proportional to the maximum V2X bandwidth. Hence, in order improve the communication distance and communication quality of the V2X communication, in an embodiment of the present disclosure, the roadside device 12 can process the received environment information to obtain sensed information containing a smaller amount of data. The sensed information is result information obtained by processing the environment information. As the result information contains a much smaller amount of data than the environment information, there will be a lower requirement on the V2X bandwidth for transmitting the sensed information containing the smaller amount of data, which in turn improves the communication distance and communication quality of the V2X communication, thereby improving the efficiency and success rate of transmission of the sensed information. In an embodiment of the present disclosure, the roadside device 12 can process the received environment information to obtain the sensed information (i.e., sensed result) containing the smaller amount of data in the following ways.

The roadside device 12 can process the received environment information to obtain the sensed information in the following non-limiting ways. The processing schemes can be determined by those skilled in the art depending on actual requirements.

When a roadside sensor is a camera, a target detection can be applied to image data transmitted by the camera to obtain a first target detection result (which may include data related to a type, position, distance from the vehicle, speed or to direction of a target object) and use the first target detection result as the sensed information associated with the camera.

Additionally or alternatively, when a roadside sensor is a laser radar, a target detection can be applied to laser point cloud data transmitted by the laser radar to obtain a second target detection result (which may include data related to a type, position, distance from the vehicle, speed or direction of a target object) and use the second target detection result as the sensed information associated with the laser radar.

Additionally or alternatively, when a roadside sensor is a millimeter wave radar, an initial result transmitted by the millimeter wave radar can be filtered to obtain a third target detection result, which can be used as the sensed information associated with the millimeter wave radar.

Additionally or alternatively, when a roadside sensor is a wind speed sensor, a wind speed voltage or a transmission output protocol transmitted by the wind speed sensor can be processed to obtain a wind speed value, which can be used as the sensed information associated with the wind speed sensor.

Additionally or alternatively, when a roadside sensor is a wind direction sensor, a wind direction voltage or a transmission output protocol transmitted by the wind direction sensor can be processed to obtain a wind direction, which can be used as the sensed information associated with the wind direction sensor.

Additionally or alternatively, when a roadside sensor is an illumination sensor, an illumination voltage value transmitted by the illumination sensor can be processed to obtain an illumination intensity, which can be used as the sensed information associated with the illumination sensor.

Additionally or alternatively, when a roadside sensor is an air quality sensor, serial interface data transmitted by the air quality sensor can be processed to obtain a pollution degree of an air quality, which can be used as the sensed information associated with the air quality sensor.

Figure 3:
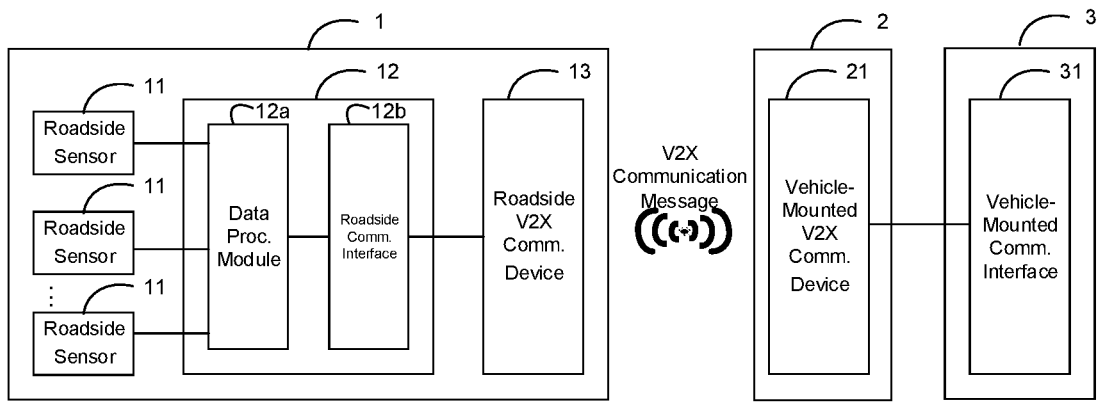
FIG. 3 is a third schematic diagram showing a structure of an automatic driving assistance system according to an embodiment of the present disclosure.

Preferably, in Example 1, as shown in FIG. 3, the roadside device 12 can include a data processing module 12a and a roadside communication interface 12b, and the vehicle-mounted automatic driving system 3 can include a vehicle-mounted communication interface 31.

The data processing module 12a is configured to process the received environment information to obtain the sensed information and transmit the sensed information to the roadside communication interface 12b.

The roadside communication interface 12b is configured to transmit the received sensed information to the roadside V2X communication device 13.

The vehicle-mounted V2X communication device 21 can transmit the obtained sensed information to the vehicle-mounted automatic driving system 3 by: transmitting the obtained sensed information to the vehicle-mounted communication interface 31.

The vehicle-mounted communication interface 31 is configured to transmit the received sensed information to respective functional modules of the vehicle-mounted automatic driving system 3.

In an embodiment of the present disclosure, the functional modules in the automatic driving system 3 may include, but not limited to, one or more of: a sensing module, an obstacle detection module, a traffic information detection module, a positioning module, a decision making module, a control module or the like.

Preferably, in order to further reduce the amount of data in the sensed information, in an embodiment of the present disclosure, the roadside device 12 can further be provided with a combining module for combining a plurality of pieces of sensed information as obtained by processing at the data processing module 12a to reduce the amount of data to be transmitted at the road side. Additionally or alternatively, the vehicle-mounted automatic driving system 13 can further be provided with a combining module for combining a plurality of pieces of sensed information as received by the vehicle-mounted communication interface 31 to reduce the amount of data to be transmitted.

Figure 4:
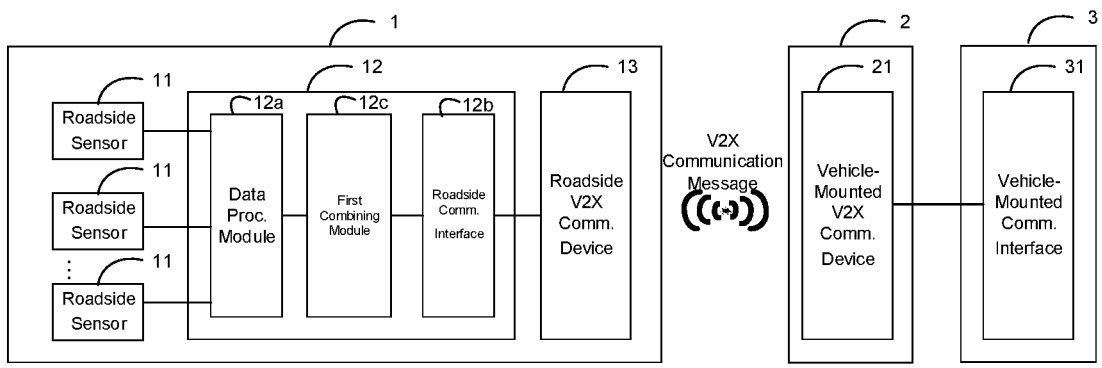
FIG. 4 is a fourth schematic diagram showing a structure of an automatic driving assistance system according to an embodiment of the present disclosure.

Preferably, in Example 2, as shown in FIG. 4, the roadside device 12 includes a data processing module 12a, a first combining module 12c and a roadside communication interface 12b. The vehicle-mounted automatic driving system 3 includes a vehicle-mounted communication interface 31.

The data processing module 12a is configured to process the received environment information to obtain the sensed information and transmit the sensed information to the first combining module 12c.

The first combining module 12c is configured to combine a plurality of pieces of sensed information as received and transmit the combined sensed information to the roadside communication interface 12b.

The roadside communication interface 12b is configured to transmit the received sensed information to the roadside V2X communication device 13.

The vehicle-mounted V2X communication device 21 can transmit the obtained sensed information to the vehicle-mounted automatic driving system 3 by transmitting the obtained sensed information to the vehicle-mounted communication interface 31.

The vehicle-mounted communication interface 31 is configured to transmit the received sensed information to respective functional modules of the vehicle-mounted automatic driving system 3.

Figure 5:
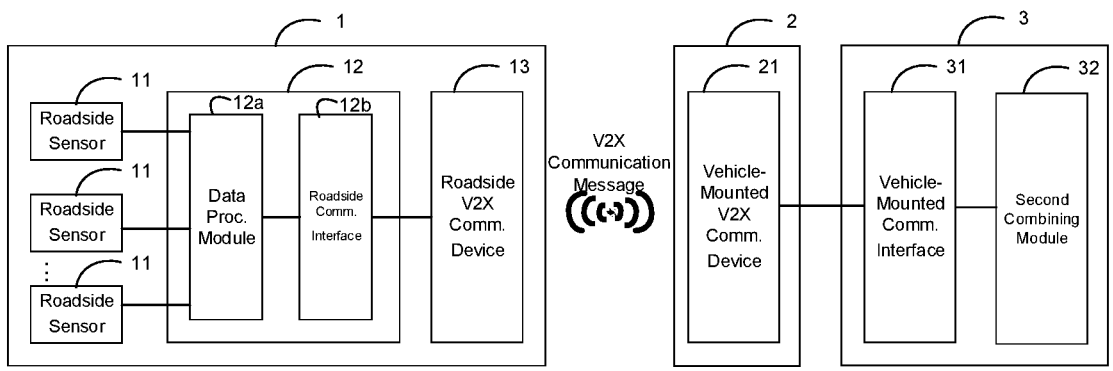
FIG. 5 is a fifth schematic diagram showing a structure of an automatic driving assistance system according to an embodiment of the present disclosure.

Preferably, in Example 3, as shown in FIG. 5, the roadside device 12 includes a data processing module 12a and a roadside communication interface 12b. The vehicle-mounted automatic driving system 3 includes a vehicle-mounted communication interface 31 and a second combining module 32.

The data processing module 12a is configured to process the received environment information to obtain the sensed information and transmit the sensed information to the roadside communication interface 12b.

The roadside communication interface 12b is configured to transmit the received sensed information to the roadside V2X communication device 13.

The vehicle-mounted V2X communication device 21 can transmit the obtained sensed information to the vehicle-mounted automatic driving system 3 by transmitting the obtained sensed information to the vehicle-mounted communication interface 31.

The vehicle-mounted communication interface 31 is configured to transmit the received sensed information to the second combining module 32.

The second combining module 32 is configured to combine a plurality of pieces of sensed information as received and transmit the combined sensed information to respective functional modules of the vehicle-mounted automatic driving system 3.

Figure 6:
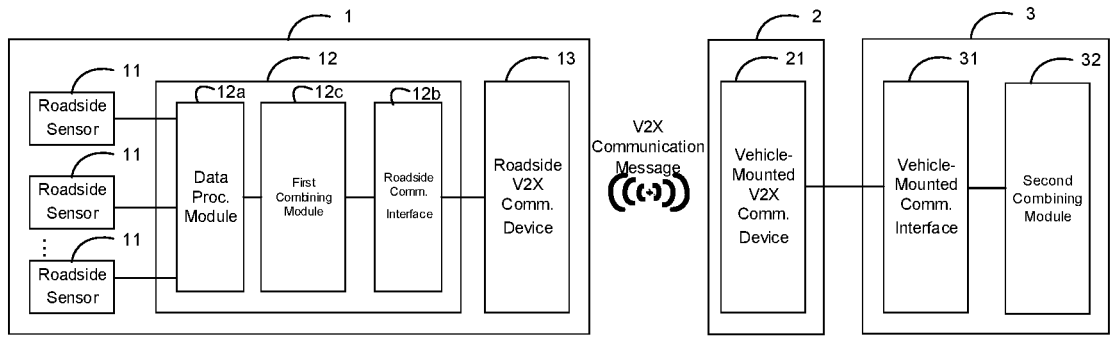
FIG. 6 is a sixth schematic diagram showing a structure of an automatic driving assistance system according to an embodiment of the present disclosure.

Preferably, in Example 4, as shown in FIG. 6, the roadside device 12 includes a data processing module 12a, a first combining module 12c and a roadside communication interface 12b. The vehicle-mounted automatic driving system 3 includes a vehicle-mounted communication interface 31 and a second combining module 32.

The data processing module 12a is configured to process the received environment information to obtain the sensed information and transmit the sensed information to the first combining module 12c.

The first combining module 12c is configured to combine a plurality of pieces of sensed information as received and transmit the combined sensed information to the roadside communication interface 12b.

The roadside communication interface 12b is configured to transmit the received sensed information to the roadside V2X communication device 13.

The vehicle-mounted V2X communication device 21 can transmit the obtained sensed information to the vehicle-mounted automatic driving system by transmitting the obtained sensed information to the vehicle-mounted communication interface 31.

The vehicle-mounted communication interface 31 is configured to transmit the received sensed information to the second combining module 32.

The second combining module 32 is configured to combine the plurality of pieces of sensed information as received and transmit the combined sensed information to respective functional modules of the vehicle-mounted automatic driving system 3.

The first combining module 12c or the second combining module 32 can combine the plurality of pieces of sensed information as received by applying a redundancy process or a merging process to the plurality of pieces of sensed information. For example, a redundancy removal process can be applied to duplicated data in the sensed information associated with different roadside sensors. For example, sensed information associated with a laser radar may contain Data A indicating an obstacle A and its position information, while sensed information associated with a camera may contain Data B indicating an obstacle A and its position information. In this case, one of Data A and Data B that has a lower confidence level can be deleted to avoid data duplication. As another example, different data in the sensed information associated with different roadside sensors can be merged into complete sensed information. There can be various schemes for the redundancy process and merging process, from which those skilled in the art can select depending on actual requirements. The present disclosure is not limited to any of these schemes.

In the above embodiment, the sensed information is transmitted between the roadside V2X communication device 13 and the vehicle-mounted V2X communication device 21 using the V2X communication technique. In particular, the roadside V2X communication device 13 can be configured to encapsulate the received sensed information into a V2X communication message and transmit the V2X communication message to an air interface. Accordingly, the vehicle-mounted V2X communication device 21 can be configured to receive the V2X communication message from the air interface, parse the V2X communication message to obtain the sensed information and transmit the obtained sensed information to the vehicle-mounted automatic driving system 3.

In some embodiments, in the automatic driving assistance systems shown in FIGS. 3-6, the roadside communication interface 12b can transmit the sensed information to the roadside V2X communication device 13 via Ethernet, and the vehicle-mounted V2X communication device 21 can transmit the sensed information to the vehicle-mounted communication interface 31 via Ethernet. For example, the roadside communication interface 12b can transmit the sensed information in a Transmission Control Protocol (TCP)/User Datagram Protocol (UDP) message to the roadside V2X communication device 13 via Ethernet, and the vehicle-mounted V2X communication device 21 can transmit the sensed information in a TCP/UDP message to the vehicle-mounted communication interface 31 via Ethernet, as shown in FIG. 7.

Figure 8:
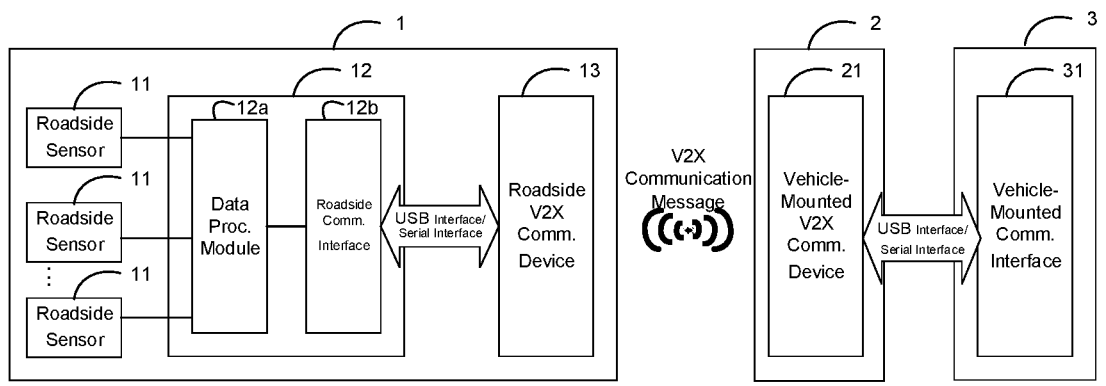
FIG. 8 is an eighth schematic diagram showing a structure of an automatic driving assistance system according to an embodiment of the present disclosure.

In some other embodiments, in the automatic driving assistance systems shown in FIGS. 3-6, the roadside communication interface 12b can transmit the sensed information to the roadside V2X communication device 13 via a Universal Serial Bus (USB) interface or a serial interface, and the vehicle-mounted V2X communication device 21 can transmit the sensed information to the vehicle-mounted communication interface 31 via a USB interface or a serial interface or using another communication scheme, as shown in FIG. 8.

Figure 7:
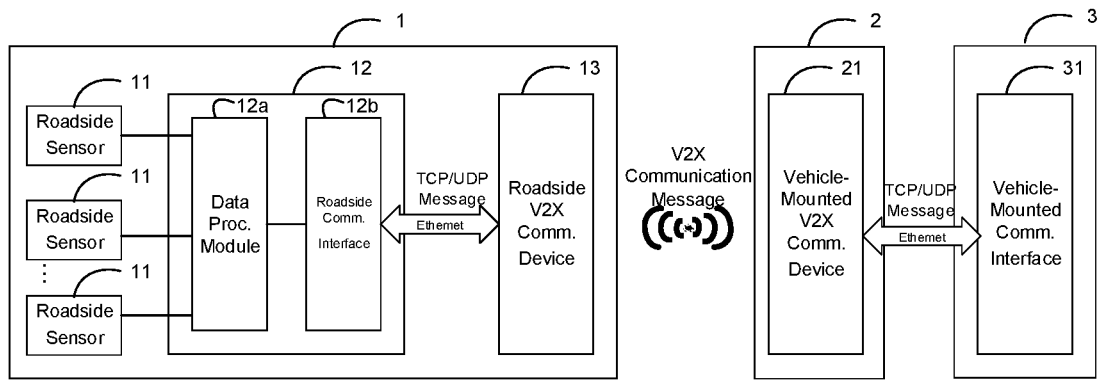
FIG. 7 is a seventh schematic diagram showing a structure of an automatic driving assistance system according to an embodiment of the present disclosure.

For example, as shown in FIG. 7, the roadside communication interface 12b is configured to encapsulate the received sensed information into a TCP/UDP message and transmit the TCP/UDP message to the roadside V2X communication device 13.

The roadside V2X communication device 13 can encapsulate the received sensed information into the V2X communication message by: parsing the TCP/UDP message received from the roadside communication interface 12b to obtain the sensed information and encapsulating the obtained sensed information into the V2X communication message.

The vehicle-mounted V2X communication device 21 can transmit the obtained sensed information to the vehicle-mounted communication interface 31 by: encapsulating the obtained sensed information into a TCP/UDP message and transmitting the TCP/UDP message to the vehicle-mounted communication interface 31.

The vehicle-mounted communication interface 31 can be configured to parse the TCP/UDP message received from the vehicle-mounted V2X communication device 21 to obtain the sensed information and transmit the obtained sensed information to the respective functional modules of the vehicle-mounted automatic driving system 3 or the second combining module 32.

In an embodiment of the present disclosure, the roadside communication interface 12b and the vehicle-mounted V2X communication device 21 can encapsulate the received sensed information into the TCP/UDP message by: encapsulating the sensed information as payload data in the TCP/UDP message. Accordingly, the roadside V2X communication device 13 and the vehicle-mounted communication interface 31 can parse the received TCP/UDP message to obtain the sensed information by: removing TCP/

Internet Protocol (IP) protocol stack format information and extracting the payload data from the TCP/UDP message to obtain the sensed information.

Preferably, in order to further reduce the amount of data, in an example, in the above embodiment, the roadside communication interface 12b can encapsulate the received sensed information into the TCP/UDP message by: serializing the received sensed information in accordance with a predetermined serialization mechanism to obtain serial binary data and encapsulating the serial binary data as payload data in the TCP/UDP message. Accordingly, the vehicle-mounted communication interface 31 can parse the TCP/UDP message received from the vehicle-mounted V2X communication device 21 to obtain the sensed information by: removing TCP/IP protocol stack format information and extracting the payload data from the TCP/UDP message, and deserializing the payload data in accordance with a predetermined deserialization mechanism to obtain the sensed information. In particular, as a non-limiting example, a message format configured for each type of sensed information can be stored in the roadside communication interface 12b and the vehicle-mounted communication interface 31 in advance (the message format is typically a format definition of a message based on some public basic language, including but not limited to boost, ASN.1 Protocol Buffer, etc.). The roadside communication interface 12b can serialize the received sensed information in accordance with the predetermined serialization mechanism to obtain serial binary data by converting a plurality pieces of data in the sensed information into a sequence of serial binary data in accordance with a corresponding message format (the serial binary data contains the plurality pieces of data in the sensed information). The vehicle-mounted communication interface 31 can deserialize the payload data in accordance with the predetermined deserialization mechanism to obtain the sensed information by converting the payload data into the corresponding sensed information in accordance with the message format.

Of course, it can be appreciated by those skilled in the art that there are some alternative schemes for reducing the amount of data. For example, the roadside communication interface 12b can encapsulate the received sensed information into the TCP/UDP message by: binary-coding the received sensed information in accordance with a predetermined coding scheme and encapsulating the result of the coding as payload data in the TCP/UDP message. Accordingly, the vehicle-mounted communication interface 31 can parse the TCP/UDP message received from the vehicle-mounted V2X communication device 21 to obtain the sensed information by: removing TCP/IP protocol stack format information and extracting the payload data from the TCP/UDP message, and decoding the payload data in accordance with a corresponding decoding scheme to obtain the sensed information. As another example, the roadside communication interface 12b can encapsulate the received sensed information into the TCP/UDP message by: compressing the received sensed information and encapsulating the result of the compressing as payload data in the TCP/UDP message. Accordingly, the vehicle-mounted communication interface 31 can parse the TCP/UDP message received from the vehicle-mounted V2X communication device 21 to obtain the sensed information by: removing TCP/IP protocol stack format information and extracting the payload data from the TCP/UDP message, and decompressing the payload data to obtain the sensed information.

In an embodiment of the present disclosure, the roadside V2X communication device 13 can encapsulate the received sensed information into the V2X communication message by: removing TCP/IP protocol stack format information and extracting the payload data from the TCP/UDP message, encapsulating the payload data into the V2X communication message and transmitting the V2X communication message to the air interface. Accordingly, the vehicle-mounted V2X communication device 21 can parse the V2X communication message to obtain the sensed information by: removing V2X protocol stack format information and extracting the payload data from the V2X communication message, encapsulating the payload data into a TCP/UDP message and transmitting the TCP/UDP message to the vehicle-mounted communication interface 31.

The vehicle-mounted communication interface 31 can transmit the received sensed information to the respective functional modules of the vehicle-mounted automatic driving system by: removing TCP/IP protocol stack format information and extracting the payload data from the received TCP/UDP message, deserializing the payload data in accordance with a predetermined deserialization mechanism to obtain the sensed information, and transmitting the sensed information to the respective functional modules of the vehicle-mounted automatic driving system 3.

For example, as shown in FIG. 8, the roadside communication interface 12b is configured to transmit the received sensed information to the roadside V2X communication device 13 via a USB interface or a serial interface. Accordingly, the vehicle-mounted V2X communication device 21 can transmit the obtained sensed information to the vehicle-mounted communication interface 31 by: transmitting the obtained sensed information to the vehicle-mounted communication interface 31 via a USB interface or a serial interface.

Preferably, a Robot Operating System (ROS) supports data sharing among multiple machines and has plenty of open-source resources. In order to improve resource and development efficiency and reduce resource and development costs, in an embodiment of the present disclosure, each of the roadside device 12 and the vehicle-mounted automatic driving system can be based on an ROS framework. In the ROS, each executable program is a node. Nodes are independent from each other and can communicate with each other by means of topics. A topic is an identifier. A node can post a message on a topic and can receive a message by subscribing to a topic. A data format for a topic can be defined depending on the message posted for the topic. Different types of messages may correspond to different data formats of topics. In an embodiment of the present disclosure, each of the data processing module 12a, the roadside communication interface 12b and the first combining module 12c in the roadside device 12 can be a node in the ROS of the roadside device 12, and each of the vehicle-mounted communication interface 31, the second combining module 32 and the respective functional modules in the vehicle-mounted automatic driving system 3 can be a node in the ROS of the automatic driving system.

In an embodiment of the present disclosure, the roadside device 12 obtains the environment information from the roadside sensors 11. Hence, driving nodes, each corresponding to one of the roadside sensors, are required in the roadside device 12 (e.g., each laser radar corresponds to a laser radar driving node and each camera corresponds to a camera driving node). Each of the driving nodes receives the environment information transmitted from its corresponding roadside sensor, treats the received environment information as a message and posts the message in form of a topic.

Figure 9A:
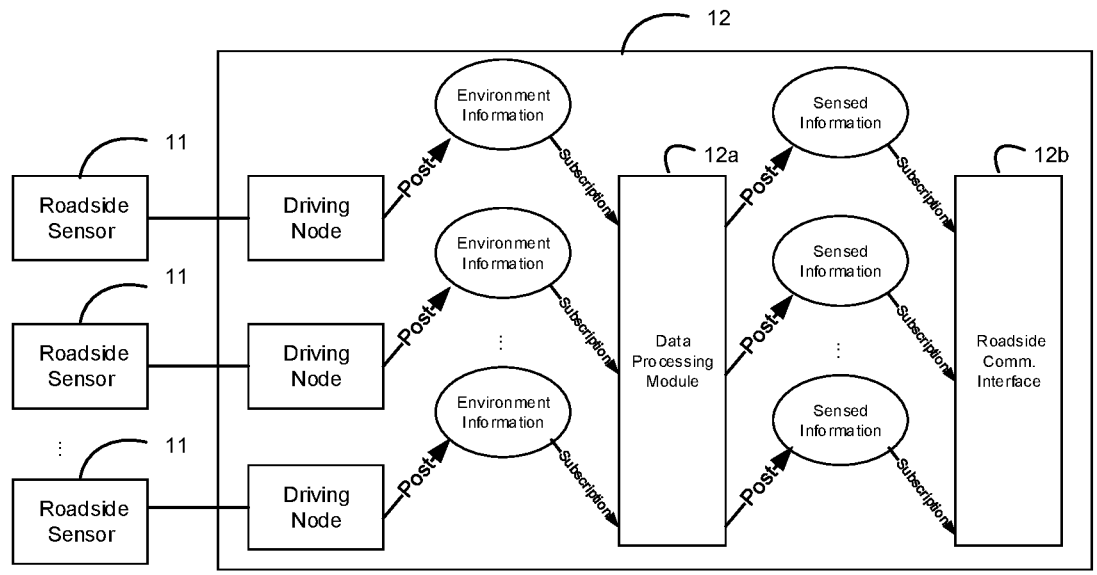
FIG. 9A is a first schematic diagram showing information transmission between various nodes in a roadside device according to an embodiment of the present disclosure.

FIG. 9A is a schematic diagram showing information transmission between various nodes in the roadside device 12 shown in FIGS. 3 and 5. In FIG. 9A, the roadside device 12 includes driving nodes each corresponding to one of the roadside sensors. Each of the driving nodes treats the environment information collected by its corresponding roadside sensor as a message and posts the message in form of a topic. The data processing module 12a subscribes to topics posted by the respective driving nodes, obtains environment information from the topics posted by the respective driving nodes, processes each piece of obtained environment information to obtain corresponding sensed information, treats each piece of sensed information as a message and posts the message in form of a topic. The roadside communication interface 12b subscribes to the topics posted by the data processing module 12a, obtains the sensed information from the topics posted by the data processing module 12a, encapsulates the obtained sensed information into a TCP/UDP message and transmits it to the roadside V2X communication device 13 via Ethernet. The roadside V2X communication device 13 parses the received TCP/UDP message to obtain the sensed information, encapsulates the sensed information into a V2X communication message and transmits it to the vehicle-mounted V2X communication device 21. The vehicle-mounted V2X communication device 21 parses the received V2X communication message to obtain the sensed information, encapsulates the sensed information into a TCP/UDP message and transmits the TCP/UDP message to the vehicle-mounted communication interface 31 via Ethernet.

Figure 9B:
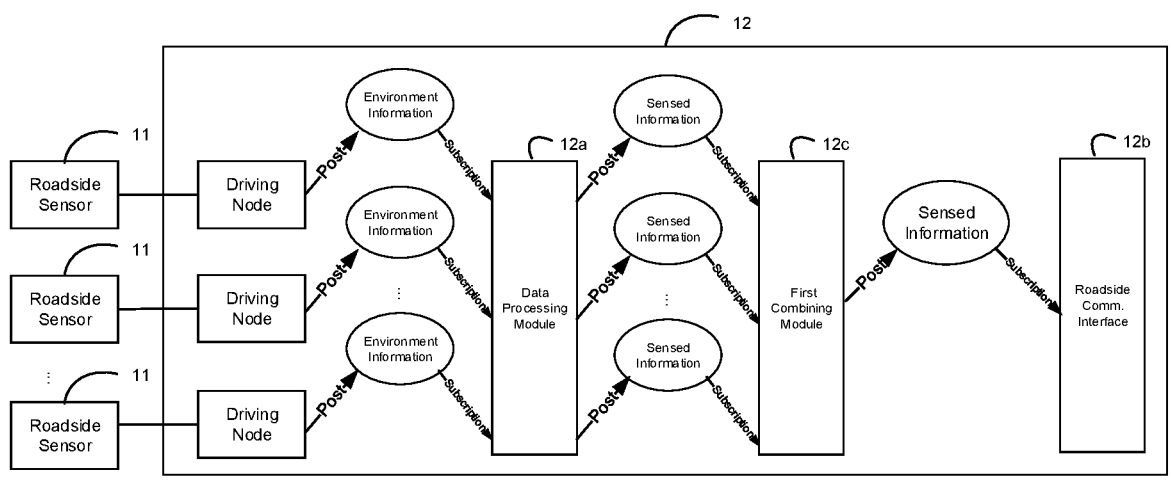
FIG. 9B is a second schematic diagram showing information transmission between various nodes in a roadside device according to an embodiment of the present disclosure.

FIG. 9B is a schematic diagram showing information transmission between various nodes in the roadside device 12 shown in FIGS. 4 and 6. In FIG. 9B, the roadside device 12 includes driving nodes each corresponding to one of the roadside sensors. Each of the driving nodes treats the environment information collected by its corresponding roadside sensor as a message and posts the message in form of a topic. The data processing module 12a subscribes to topics posted by the driving nodes, obtains environment information from the topics posted by the driving nodes, processes each piece of obtained environment information to obtain corresponding sensed information, treats each piece of sensed information as a message and posts the message in form of a topic. The first combining module 12c subscribes to the topics posted by the data processing module 12a, obtains the sensed information from the topics posted by the data processing module 12a, combines a plurality of pieces of obtained sensed information, treats each piece of combined sensed information as a message and posts the message in form of a topic. The roadside communication interface 12b subscribes to the topics posted by the first combining module 12c, obtains the sensed information from the topics posted by the first combining module 12c, encapsulates the obtained sensed information into a TCP/UDP message and transmits it to the roadside V2X communication device 13 via Ethernet. The roadside V2X communication device 13 parses the received TCP/UDP message to obtain the sensed information, encapsulates the sensed information into a V2X communication message and transmits it to the vehicle-mounted V2X communication device 21. The vehicle-mounted V2X communication device 21 parses the received V2X communication message to obtain the sensed information, encapsulates the sensed information into a TCP/UDP message and transmits the TCP/UDP message to the vehicle-mounted communication interface 31 via Ethernet.

Figure 10A:
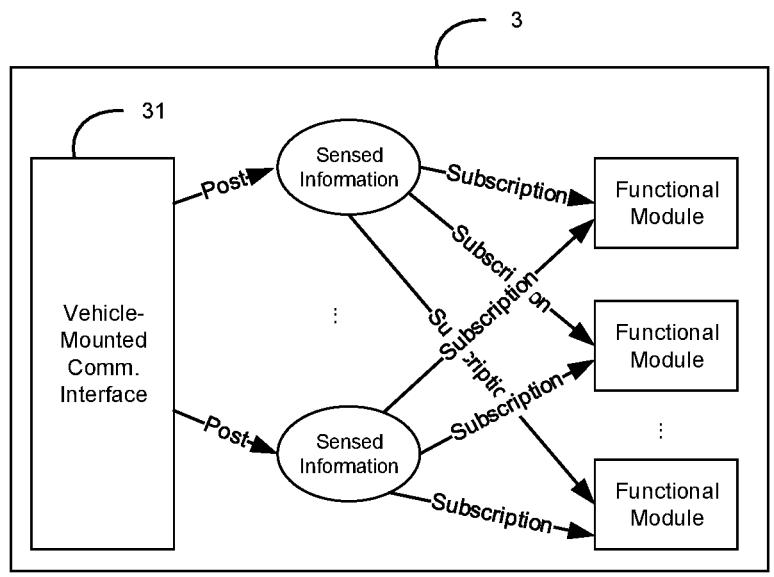
FIG. 10A is a first schematic diagram showing information transmission between various nodes in a vehicle-mounted automatic driving system according to an embodiment of the present disclosure.

FIG. 10A is a schematic diagram showing information transmission between various nodes in the vehicle-mounted automatic driving system shown in FIGS. 3 and 4. In FIG. 10A, the vehicle-mounted communication interface 31 parses the received TCP/UDP message to obtain the sensed information, treats each piece of sensed information as a message and posts the message in form of a topic. The respective functional modules of the vehicle-mounted automatic driving system subscribe to the topics posted by the vehicle-mounted communication interface 31 and obtain the sensed information they require from the topics posted by the vehicle-mounted communication interface 31.

Figure 10B:
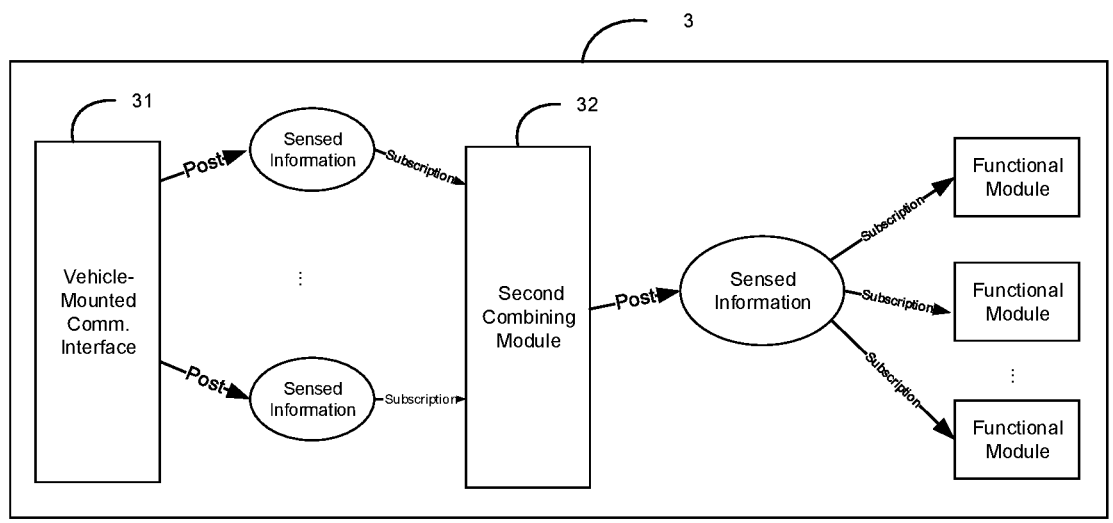
FIG. 10B is a second schematic diagram showing information transmission between various nodes in a vehicle-mounted automatic driving system according to an embodiment of the present disclosure.

FIG. 10B is a schematic diagram showing information transmission between various nodes in the vehicle-mounted automatic driving system shown in FIGS. 5 and 6. In FIG. 10B, the vehicle-mounted communication interface 31 parses the received TCP/UDP message to obtain the sensed information, treats each piece of sensed information as a message and posts the message in form of a topic. The second combining module 32 subscribes to the topics posted by the vehicle-mounted communication interface 31, obtains the sensed information from the topics posted by the vehicle-mounted communication interface 31, combines a plurality of obtained sensed information, treats the combined sensed information as a message and posts the message in form of a topic. The respective functional modules of the vehicle-mounted automatic driving system subscribe to the topics posted by the second combining module 32 and obtain the sensed information they require from the topics posted by the second combining module 32.

When the contents of the topics change subsequently, both the road side and the vehicle side only need to be updated to ensure consistency in message definition rules. No other complicated operations will be required, such that the costs of research, development and integration can be reduced.

Embodiment 2

Based on the same concept as the automatic driving assistance system according to the above Embodiment 1, in Embodiment 2 of the present disclosure, a roadside assistance system is provided. The system includes a roadside sensor, a roadside device, and a roadside V2X communication device. The roadside sensor is configured to collect environment information of an ambient environment and transmit the environment information to the roadside device. The roadside device is configured to process the received environment information to obtain sensed information and transmit the sensed information to the roadside V2X communication device. The roadside V2X communication device is configured to transmit the received sensed information to a vehicle-mounted V2X communication device.

In an embodiment of the present disclosure, the roadside sensor may include one or more of: a camera, a laser radar, a millimeter wave radar, a positioning sensor, an illumination sensor, a wind speed sensor, a wind direction sensor, an air quality sensor, a temperature sensor or a humidity sensor.

In Example 1, the roadside device includes a data processing module and a roadside communication interface. The data processing module is configured to process the received environment information to obtain the sensed information and transmit the sensed information to the roadside communication interface. The roadside communication interface is configured to transmit the received sensed information to the roadside V2X communication device.

In Example 2, the roadside device includes a data processing module, a first combining module and a roadside communication interface. The data processing module is configured to process the received environment information to obtain the sensed information and transmit the sensed information to the first combining module. The first combining module is configured to combine a plurality of pieces of sensed information as received and transmit the combined sensed information to the roadside communication interface. The roadside communication interface is configured to transmit the received sensed information to the roadside V2X communication device.

In an example, the roadside communication interface is configured to encapsulate the received sensed information into a TCP/UDP message and transmit the TCP/UDP message to the roadside V2X communication device. The roadside V2X communication device can encapsulate the received sensed information into the V2X communication message by: parsing the TCP/UDP message received from the roadside communication interface to obtain the sensed information and encapsulating the obtained sensed information into the V2X communication message.

Preferably, the roadside communication interface can encapsulate the received sensed information into the TCP/UDP message by: serializing the received sensed information in accordance with a predetermined serialization mechanism to obtain serial binary data and encapsulating the serial binary data as payload data in the TCP/UDP message.

Preferably, in another example, the roadside communication interface is configured to transmit the received sensed information to the roadside V2X communication device via a USB interface or a serial interface.

Preferably, in an embodiment of the present disclosure, the roadside device is based on an ROS framework. The roadside device further includes driving nodes each corresponding to one of roadside sensors. Each of the driving nodes treats the environment information collected by its corresponding roadside sensor as a message and posts the message in form of a topic. The data processing module subscribes to topics posted by the respective driving nodes, obtains environment information from the topics posted by the driving nodes, processes each piece of obtained environment information to obtain corresponding sensed information, treats each piece of sensed information as a message and posts the message in form of a topic. In Example 1, the roadside communication interface subscribes to the topics posted by the data processing module and obtains the sensed information from the topics posted by the data processing module. In Example 2, the first combining module subscribes to the topics posted by the data processing module, obtains the sensed information from the topics posted by the data processing module, combines a plurality of pieces of obtained sensed information, treats each piece of combined sensed information as a message and posts the message in form of a topic. The roadside communication interface subscribes to the topics posted by the first combining module and obtains the sensed information from the topics posted by the first combining module 12c.

Embodiment 3

Based on the same concept as the automatic driving assistance system according to the above Embodiment 1, in Embodiment 3 of the present disclosure, a vehicle-mounted assistance system is provided. The system includes a vehicle-mounted V2X communication device connected to a vehicle-mounted automatic driving system. The vehicle-mounted V2X communication device is configured to receive sensed information from a roadside V2X communication device and transmit the received sensed information to the vehicle-mounted automatic driving system.

Preferably, the vehicle-mounted V2X communication device is configured to receive the V2X communication message transmitted from the roadside V2X communication device from an air interface, parse the V2X communication message to obtain the sensed information and transmit the obtained sensed information to the vehicle-mounted automatic driving system.

In Example 1, the vehicle-mounted automatic driving system includes a vehicle-mounted communication interface. The vehicle-mounted V2X communication device can transmit the obtained sensed information to the vehicle-mounted automatic driving system by transmitting the obtained sensed information to the vehicle-mounted communication interface. The vehicle-mounted communication interface is configured to transmit the received sensed information to respective functional modules of the vehicle-mounted automatic driving system.

In Example 2, the vehicle-mounted automatic driving system includes a vehicle-mounted communication interface and a second combining module. The vehicle-mounted communication interface is configured to transmit the received sensed information to the second combining module. The second combining module is configured to combine a plurality of pieces of sensed information as received and transmit the combined sensed information to respective functional modules of the vehicle-mounted automatic driving system.

Preferably, the vehicle-mounted V2X communication device can transmit the obtained sensed information to the vehicle-mounted communication interface by: encapsulating the obtained sensed information into a TCP/UDP message and transmitting the TCP/UDP message to the vehicle-mounted communication interface. The vehicle-mounted communication interface is configured to parse the TCP/UDP message received from the vehicle-mounted V2X communication device to obtain the sensed information and transmit the obtained sensed information to respective functional modules of the vehicle-mounted automatic driving system Preferably, the vehicle-mounted communication interface can parse the TCP/UDP message received from the vehicle-mounted V2X communication device to obtain the sensed information by: removing TCP/Internet Protocol (IP) protocol stack format information and extracting the payload data from the TCP/UDP message, and deserializing the payload data in accordance with a predetermined deserialization mechanism to obtain the sensed information.

Preferably, the vehicle-mounted V2X communication device can transmit the obtained sensed information to the vehicle-mounted communication interface by: transmitting the obtained sensed information to the vehicle-mounted communication interface via a USB interface or a serial interface.

Preferably, the automatic driving system is based on an ROS framework. The vehicle-mounted communication interface treats each piece of received sensed information as a message and posts the message in form of a topic. In Example 1, the respective functional modules of the vehicle-mounted automatic driving system subscribe to the topics posted by the vehicle-mounted communication interface and obtain the sensed information from the topics posted by the vehicle-mounted communication interface. In Example 2, the second combining module subscribes to the topics posted by the vehicle-mounted communication interface, obtains the sensed information from the topics posted by the vehicle-mounted communication interface, combines a plurality of obtained sensed information, treats the combined sensed information as a message and posts the message in form of a topic. The respective functional modules of the vehicle-mounted automatic driving system subscribe to the topics posted by the second combining module and obtain the sensed information from the topics posted by the second combining module.

The basic principles of the present disclosure have been described above with reference to the embodiments. However, it can be appreciated by those skilled in the art that all or any of the steps or components of the method or apparatus according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present invention as defined by the claims and their equivalents.

What is claimed is:

1. An automatic driving assistance system, comprising a roadside assistance system and a vehicle-mounted assistance system, the roadside assistance system comprising a plurality of roadside sensors, a roadside device and a roadside Vehicle to Everything (V2X) communication device, and the vehicle-mounted assistance system comprising a vehicle-mounted V2X communication device, wherein:

each of the plurality of roadside sensors is configured to collect environment information of an ambient environment and transmit the environment information to the roadside device;

the roadside device is configured to:

generate a plurality of messages from the environment information collected by the plurality of roadside sensors, the plurality of messages including a plurality of pieces of sensed information, each piece of sensed information being generated from the environment information collected by a respective one of the plurality of roadside sensors, combine the plurality of messages generated from the environment information collected by the plurality of roadside sensors into a single message at least by removing redundant sensed information based on a confidence level associated with each piece of sensed information, the single message comprising combined sensed information, and transmit the combined sensed information to the roadside V2X communication device;

the roadside V2X communication device is configured to transmit the combined sensed information to the vehicle-mounted V2X communication device; and the vehicle-mounted V2X communication device is configured to transmit the combined sensed information to a vehicle-mounted automatic driving system.

2. The automatic driving assistance system of claim 1, wherein the roadside V2X communication device is configured to encapsulate the combined sensed information into a V2X communication message and transmit the V2X communication message to an air interface; and wherein the vehicle-mounted V2X communication device is configured to receive the V2X communication message from the air interface, parse the V2X communication message to obtain the combined sensed information, and transmit the combined sensed information to the vehicle-mounted automatic driving system.

3. The automatic driving assistance system of claim 2, wherein the roadside device comprises a roadside communication interface, and the vehicle-mounted automatic driving system comprises a vehicle-mounted communication interface, and wherein:
the roadside communication interface is configured to transmit the combined sensed information to the roadside V2X communication device;
the vehicle-mounted V2X communication device transmitting the combined sensed information to the vehicle-mounted automatic driving system comprises transmitting the combined sensed information to the vehicle-mounted communication interface; and
the vehicle-mounted communication interface is configured to transmit the combined sensed information to respective functional modules of the vehicle-mounted automatic driving system.

4. The automatic driving assistance system of claim 3, wherein:
the roadside communication interface is configured to encapsulate the combined sensed information into a Transmission Control Protocol (TCP)/User Datagram Protocol (UDP) message and transmit the TCP/UDP message to the roadside V2X communication device;
the roadside V2X communication device encapsulating the combined sensed information into the V2X communication message comprises: parsing the TCP/UDP message received from the roadside communication interface to obtain the combined sensed information and encapsulating the combined sensed information into the V2X communication message;
the vehicle-mounted V2X communication device transmitting the combined sensed information to the vehicle-mounted communication interface comprises: encapsulating the combined sensed information into a TCP/UDP message and transmitting the TCP/UDP message to the vehicle-mounted communication interface; and
the vehicle-mounted communication interface is configured to parse the TCP/UDP message received from the vehicle-mounted V2X communication device to obtain the combined sensed information.

5. The automatic driving assistance system of claim 4, wherein the roadside communication interface encapsulating the combined sensed information into the TCP/UDP message comprises:
serializing the combined sensed information in accordance with a predetermined serialization mechanism to obtain serial binary data; and
encapsulating the serial binary data as payload data in the TCP/UDP message; and
wherein the vehicle-mounted communication interface parsing the TCP/UDP message received from the vehicle-mounted V2X communication device to obtain the combined sensed information comprises:
removing TCP/Internet Protocol (IP) protocol stack format information;
extracting the payload data from the TCP/UDP message; and
deserializing the payload data in accordance with a predetermined deserialization mechanism to obtain the combined sensed information.

6. The automatic driving assistance system of claim 3, wherein the roadside communication interface is configured to transmit the combined sensed information to the roadside V2X communication device via a Universal Serial Bus (USB) interface or a serial interface; and
the vehicle-mounted V2X communication device transmitting the combined sensed information to the vehicle-mounted communication interface comprises: transmitting the combined sensed information to the vehicle-mounted communication interface via a USB interface or a serial interface.

7. The automatic driving assistance system of claim 3, wherein each of the roadside device and the automatic driving system is based on a framework comprising open-source resources and configured to support data sharing;
the roadside device further comprises driving nodes each corresponding to one of the plurality of roadside sensors;
each of the driving nodes treats the environment information collected by its corresponding roadside sensor as a message and posts the message in form of a topic.

8. The automatic driving assistance system of claim 1, wherein each of the plurality of roadside sensors comprises one of: a camera, a laser radar, a millimeter wave radar, a positioning sensor, an illumination sensor, a temperature sensor, or a humidity sensor.

9. A roadside assistance system, comprising a plurality of roadside sensors, a roadside device, and a roadside Vehicle to Everything (V2X) communication device, wherein:
each of the plurality of roadside sensors is configured to collect environment information of an ambient environment and transmit the environment information to the roadside device;
the roadside device is configured to:
generate a plurality of messages from the environment information collected by the plurality of roadside sensors, the plurality of messages including a plurality of pieces of sensed information, each piece of sensed information being generated from the environment information collected by a respective one of the plurality of roadside sensors,
combine the plurality of messages generated from the environment information collected by the plurality of roadside sensors into a single message at least by removing redundant sensed information based on a confidence level associated with each piece of sensed information, the single message comprising combined sensed information, and
transmit the combined sensed information to the roadside V2X communication device; and
the roadside V2X communication device is configured to transmit the combined sensed information to a vehicle-mounted V2X communication device.

10. The roadside assistance system of claim 9, wherein the roadside V2X communication device is configured to encapsulate the combined sensed information into a V2X communication message and transmit the V2X communication message to an air interface.

11. The roadside assistance system of claim 10, wherein the roadside device comprises a roadside communication interface, and wherein the roadside communication interface is configured to transmit the combined sensed information to the roadside V2X communication device.

12. The roadside assistance system of claim 11, wherein the roadside communication interface is configured to encapsulate the combined sensed information into a Transmission Control Protocol (TCP)/User Datagram Protocol (UDP) message and transmit the TCP/UDP message to the roadside V2X communication device; and wherein the roadside V2X communication device encapsulating the combined sensed information into the V2X communication message comprises:

parsing the TCP/UDP message received from the roadside communication interface to obtain the combined sensed information; and encapsulating the combined sensed information into the V2X communication message.

13. The roadside assistance system of claim 12, wherein the roadside communication interface encapsulating the combined sensed information into the TCP/UDP message comprises:

serializing the combined sensed information in accordance with a predetermined serialization mechanism to obtain serial binary data; and encapsulating the serial binary data as payload data in the TCP/UDP message.

14. The roadside assistance system of claim 11, wherein the roadside communication interface is configured to transmit the combined sensed information to the roadside V2X communication device via a Universal Serial Bus (USB) interface or a serial interface.

15. The roadside assistance system of claim 11, wherein:

the roadside device is based on a framework comprising open-source resources and configured to support data sharing;

the roadside device further comprises driving nodes each corresponding to one of the plurality of roadside sensors; and each of the driving nodes treats the environment information collected by its corresponding roadside sensor as a message and posts the message in form of a topic.

16. The roadside assistance system of claim 9, wherein each of the plurality of roadside sensors comprises one: a camera, a laser radar, a millimeter wave radar, a positioning sensor, an illumination sensor, a temperature sensor, or a humidity sensor.

17. A vehicle-mounted assistance system, comprising a vehicle-mounted Vehicle to Everything (V2X) communication device connected to a vehicle-mounted automatic driving system, wherein:

the vehicle-mounted V2X communication device is configured to receive combined sensed information from a roadside V2X communication device and transmit the combined sensed information to the vehicle-mounted automatic driving system, the roadside V2X communication device is coupled to a plurality of roadside sensors, wherein each of the plurality of roadside sensors is configured to collect environment information of an ambient environment and transmit the environment information to a roadside device, and the roadside V2X communication device is coupled to the roadside device that is configured to:

generate a plurality of messages from the environment information collected by the plurality of roadside sensors, the plurality of messages including a plurality of pieces of sensed information, each piece of sensed information being generated from the environment information collected by a respective one of the plurality of roadside sensors, and combine the plurality of messages generated from the environment information collected by the plurality of roadside sensors into a single message at least by removing redundant sensed information based on a confidence level associated with each piece of sensed information, the single message comprising combined sensed information.

18. The vehicle-mounted assistance system of claim 17, wherein the vehicle-mounted V2X communication device is configured to receive the V2X communication message transmitted from the roadside V2X communication device from an air interface, parse the V2X communication message to obtain the combined sensed information and transmit the combined sensed information to the vehicle-mounted automatic driving system.

19. The vehicle-mounted assistance system of claim 18, wherein the vehicle-mounted automatic driving system comprises a vehicle-mounted communication interface, and wherein:

the vehicle-mounted V2X communication device transmitting the combined sensed information to the vehicle-mounted automatic driving system comprises transmitting the combined sensed information to the vehicle-mounted communication interface; and the vehicle-mounted communication interface is configured to transmit the combined sensed information to respective functional modules of the vehicle-mounted automatic driving system.

20. The vehicle-mounted assistance system of claim 19, wherein the vehicle-mounted V2X communication device transmitting the combined sensed information to the vehicle-mounted communication interface comprises: encapsulating the combined sensed information into a Transmission Control Protocol (TCP)/User Datagram Protocol (UDP) message and transmitting the TCP/UDP message to the vehicle-mounted communication interface; and wherein the vehicle-mounted communication interface is configured to parse the TCP/UDP message received from the vehicle-mounted V2X communication device to obtain the combined sensed information.

21. The vehicle-mounted assistance system of claim 20, wherein the vehicle-mounted communication interface parsing the TCP/UDP message received from the vehicle-mounted V2X communication device to obtain the combined sensed information comprises:

removing TCP/Internet Protocol (IP) protocol stack format information and extracting the payload data from the TCP/UDP message; and deserializing the payload data in accordance with a predetermined deserialization mechanism to obtain the combined sensed information.

22. The vehicle-mounted assistance system of claim 19, wherein the vehicle-mounted V2X communication device transmitting the combined sensed information to the vehicle-mounted communication interface comprises transmitting the combined sensed information to the vehicle-mounted communication interface via a Universal Serial Bus (USB) interface or a serial interface.

23. The vehicle-mounted assistance system of claim 19, wherein the automatic driving system is based on a framework comprising open-source resources and configured to support data sharing; and wherein the vehicle-mounted communication interface treats the combined sensed information as a message and posts the message in form of a topic.

* * * * *